US012212520B2

(12) United States Patent
Ekpenyong et al.

(10) Patent No.: US 12,212,520 B2
(45) Date of Patent: *Jan. 28, 2025

(54) METHODS FOR ENERGY-EFFICIENT UNICAST AND MULTICAST TRANSMISSION IN A WIRELESS COMMUNICATION SYSTEM

(71) Applicant: Texas Instruments Incorporated, Dallas, TX (US)

(72) Inventors: Anthony Edet Ekpenyong, Houston, TX (US); Ralf Matthias Bendlin, Plano, TX (US); Eko Nugroho Onggosanusi, Allen, TX (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/527,109

(22) Filed: Nov. 15, 2021

(65) Prior Publication Data

US 2022/0255685 A1 Aug. 11, 2022

Related U.S. Application Data

(63) Continuation of application No. 14/158,569, filed on Jan. 17, 2014, now Pat. No. 11,177,919.

(Continued)

(51) Int. Cl.
*H04L 5/00* (2006.01)

(52) U.S. Cl.
CPC ............ *H04L 5/005* (2013.01); *H04L 5/001* (2013.01); *H04L 5/0044* (2013.01);
(Continued)

(58) Field of Classification Search
CPC ....... H04L 5/005; H04L 5/001; H04L 5/0044; H04L 5/0048
See application file for complete search history.

(56) References Cited

U.S. PATENT DOCUMENTS 9,629,162 B2    4/2017  Nagata et al.
11,177,919 B2 * 11/2021 Ekpenyong ........... H04L 5/0044
(Continued)

FOREIGN PATENT DOCUMENTS

EP          2608433 A2   6/2013
EP          2988562 A1   2/2016
(Continued)

OTHER PUBLICATIONS

"Further Consideration on multiplexing of Unicast and MBMS," 3GPP TSG RAN WG1 Meeting #44, R1-060548, Huawei, Denver, US Feb. 13-17, 2006, 4 pages.

(Continued)

*Primary Examiner* — Jamal Javaid
*Assistant Examiner* — Ryan C Kavleski
(74) *Attorney, Agent, or Firm* — Gregory J. Albin; Frank D. Cimino

(57) ABSTRACT

A method for time multiplexing subframes on a serving cell to a user equipment, wherein one set of subframes operate with the legacy LTE transmission format and one set of subframes operate with an evolved transmission format comprising reduced density CRS transmission without a PDCCH control region.

6 Claims, 8 Drawing Sheets

Related U.S. Application Data

(60) Provisional application No. 61/833,726, filed on Jun. 11, 2013, provisional application No. 61/808,784, filed on Apr. 5, 2013, provisional application No. 61/806,269, filed on Mar. 28, 2013, provisional application No. 61/804,310, filed on Mar. 22, 2013, provisional application No. 61/804,089, filed on Mar. 21, 2013, provisional application No. 61/767,510, filed on Feb. 21, 2013, provisional application No. 61/767,515, filed on Feb. 21, 2013, provisional application No. 61/754,429, filed on Jan. 18, 2013.

(52) U.S. Cl.
CPC .......... *H04L 5/0048* (2013.01); *H04L 5/0051* (2013.01); *H04L 5/0053* (2013.01); *H04L 5/0064* (2013.01)

(56) References Cited

U.S. PATENT DOCUMENTS

| | | | |
|---|---|---|---|
| 2010/0020771 A1* | 1/2010 | Ji | H04L 1/0004 370/336 |
| 2010/0272032 A1 | 10/2010 | Sayana et al. | |
| 2011/0164549 A1 | 7/2011 | Huang et al. | |
| 2011/0310837 A1 | 12/2011 | Classon et al. | |
| 2012/0327895 A1 | 12/2012 | Wallen et al. | |
| 2013/0094411 A1* | 4/2013 | Zhang | H04L 5/0048 370/281 |
| 2013/0176952 A1 | 7/2013 | Shin et al. | |
| 2013/0250874 A1 | 9/2013 | Luo et al. | |
| 2013/0250882 A1* | 9/2013 | Dinan | H04L 5/0092 370/329 |
| 2013/0260741 A1 | 10/2013 | Yamada | |
| 2013/0294317 A1* | 11/2013 | Malladi | H04W 4/06 370/312 |
| 2013/0301565 A1* | 11/2013 | Xu | H04L 5/00 370/329 |
| 2013/0308555 A1 | 11/2013 | Ho | |
| 2014/0044054 A1* | 2/2014 | Kim | H04B 7/024 370/329 |
| 2014/0092785 A1 | 4/2014 | Song et al. | |
| 2014/0112243 A1* | 4/2014 | Suzuki | H04W 76/28 370/328 |
| 2014/0254567 A1 | 9/2014 | Han et al. | |
| 2014/0348077 A1 | 11/2014 | Chen et al. | |
| 2015/0016419 A1 | 1/2015 | Kim et al. | |
| 2015/0103800 A1 | 4/2015 | Seo et al. | |
| 2015/0327247 A1 | 11/2015 | Chen et al. | |
| 2015/0358094 A1 | 12/2015 | Yi et al. | |
| 2016/0374058 A1 | 12/2016 | Dinan | |

FOREIGN PATENT DOCUMENTS

| | | |
|---|---|---|
| WO | 2012023835 A2 | 2/2012 |
| WO | 2012023835 A3 | 2/2012 |
| WO | 20130163289 A1 | 10/2013 |

OTHER PUBLICATIONS

"Longer CP for MBMS," 3GPP TSG RAN1 #47-bis, R1-070424, Qualcomm Europe, Sorrento, Italy, Jan. 15-19, 2007, 2 pages.
"Performance of Frequency Multiplexing for Broadcast and Unicast," 3GPP TSG RAN WG1 Meeting #47bis, R1-070528, Samsung, Sorrento, Italy, Jan. 15-19, 2007, 6 pages.
"Design Considerations for Additional Carrier Types," 3GPP TSG RAN WG1 Meeting #67, R1-114044, Alcatel-Lucent, Alcatel-Lucent Shanghai Bell, San Francisco, USA, Nov. 14-18, 2011, 4 pages.
General Considerations on New Carrier Types, 3GPP TSG RAN WG1 #68, R1-120711, Nokia Siemens Networks, Nokia, Dreden, Germany, Feb. 6-10, 2012, 4 pages.
"EPDCCH in MBSFN Subframes," 3GPP TSG RAN WG1 Meeting #69, R1-122756, Alcatel-Lucent Shanghai Bell, Alcatel-Lucent, Prague, Czech Republic, May 21-25, 2012, 2 pages.
Requirements and Necessary Enhancements for REL-12 NCT, 3GPP TSG RAN WG1 Meeting #71, R1-124856, NEC Group, New Orleans, USA, Nov. 12-16, 2012, 6 pages.
"RRM in New Carrier Type," 3GPP TSG RAN WG1 #72, R1-130252, LG Electronics, St. Julian, Malta, Jan. 28-Feb. 1, 2013, 4 pages.
"MBMS Support on NCT," 3GPP TSG RAN WG1 Meeting #74, R1-132957, Barcelona, Spain, Aug. 19-23, 2013, 4 pages.
Extended European Search Report dated Apr. 7, 2017, European Application No. 14740291.1, 20 pages.
Communication Pursuant to Article 94(3) EPC dated Jun. 14, 2018, European Application No. 14740291.1, 6 pages.
Communication under Rule 71(3) EPC dated Aug. 9, 2019, European Application No. 14740291.1, 8 pages.
Communication Pursuant to Rule 164(1) dated Feb. 11, 2016, European Application No. 14740291.1, 7 pages.
International Search Report and Written Opinion dated May 15, 2014, PCT Application No. PCT/US2014/012318, 12 pages.
Prosecution History, U.S. Appl. No. 14/158,569, filed Jan. 17, 2014, 538 pages.
"Aspects of the synchronized carrier case," 3GPP TSG RAN WG1#71, R1-125159, Huawei, HiSilicon, New Orleans, USA, Nov. 12-16, 2012, 6 pages.
First Office Action dated Mar. 1, 2024, 13 pages.

* cited by examiner

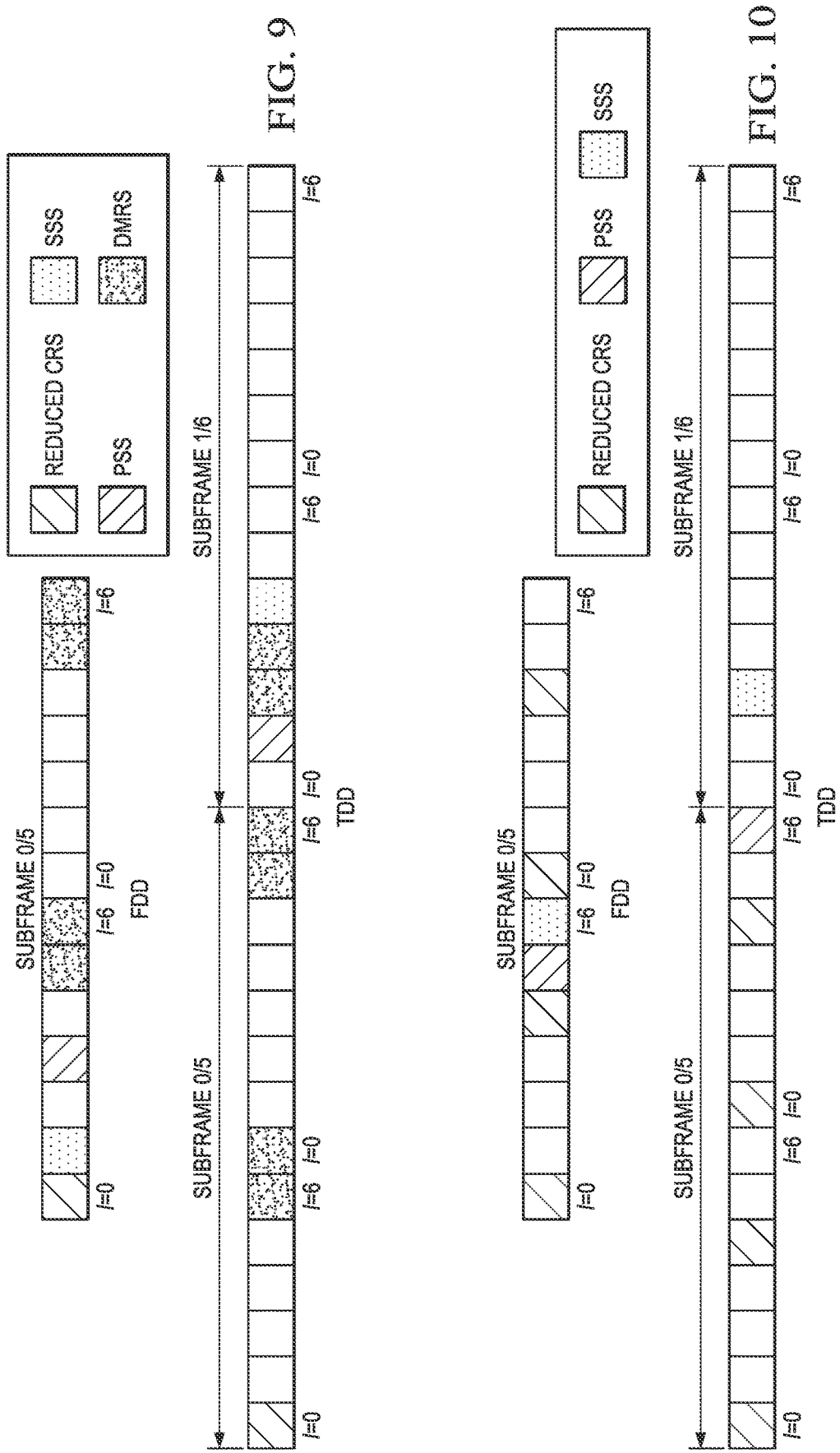

METHODS FOR ENERGY-EFFICIENT UNICAST AND MULTICAST TRANSMISSION IN A WIRELESS COMMUNICATION SYSTEM

This application is a continuation of U.S. patent application Ser. No. 14/158,569, filed Jan. 17, 2014, which claims the benefit of U.S. Provisional Application No. 61/754,429, filed on Jan. 18, 2013; U.S. Provisional Application No. 61/767,510, filed on Feb. 21, 2013; U.S. Provisional Application No. 61/767,515, filed on Feb. 21, 2013; U.S. Provisional Application No. 61/804,089, filed on Mar. 21, 2013; U.S. Provisional Application No. 61/804,310, filed on Mar. 22, 2013; U.S. Provisional Application No. 61/806,269, filed on Mar. 28, 2013; U.S. Provisional Application No. 61/808,784, filed on Apr. 5, 2013; and U.S. Provisional Application No. 61/833,726, filed on Jun. 11, 2013. The entire content of each of the above-mentioned applications is incorporated herein by reference.

FIELD OF THE INVENTION

This invention generally relates to wireless communications, and in particular to User Equipment connected to a base station.

BACKGROUND OF THE INVENTION

Cellular communication networks incorporate a number of wireless terminal devices and a number of base stations for the purpose of providing communications services such as telephony, data, video, messaging, chat and broadcast. A number of wireless terminals can be connected to a serving cell that is controlled by a base station (BS). Typical access schemes employed in widely used cellular networks include Frequency Division Multiple Access (FDMA), Time Division Multiple Access (TDMA), Code Division Multiple Access (CDMA), Orthogonal Frequency Division Multiple Access (OFDMA), Single-Carrier Frequency Division Multiple Access (SC-FDMA) or combinations thereof. The base station (BS) may also be called either a NodeB in the Universal Mobile Telecommunications System (UMTS), or an evolved NodeB (eNB) in the Long Term Evolution specified by the Third Generation Partnership Project (3GPP), a base transceiver system (BTS), an access point (AP), or some other equivalent terminology.

In general, eNodeB hardware, when deployed, is fixed and stationary but in some cases, such as when deployed on a car, may also be mobile. In contrast to the eNodeB, the wireless terminal devices can be portable hardware. The wireless terminal device is commonly referred to as a User Equipment (UE), a mobile station, a cellular phone, a personal digital assistant (PDA), a wireless modem card, and so on. Uplink (UL) communication refers to communication from a fixed or mobile UE to the eNodeB, whereas downlink (DL) communication refers to communication from the eNodeB to the fixed or mobile UE. Each eNodeB contains radio frequency transmitter(s) and receiver(s) used to communicate directly with the mobiles, which move either freely around it or are also at a fixed location. Similarly, each UE contains radio frequency transmitter(s) and receiver(s) used to communicate directly with the eNodeB.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) is operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 is handed over to base station 102. Because UE 109 is synchronized with base station 101, UE 109 can employ non-synchronized random access to initiate handover to base station 102.

FIG. 2 shows the relation between an Evolved Universal Terrestrial Radio Access Network (E-UTRAN) 200 such as illustrated in FIG. 1 and the Core Network (CN) 210 in a LTE wireless network. The eNodeBs 203 and 204 communicate with the Mobility Management Entity (MME) 211 and the Serving Gateway 212 via the Si signaling interface 205. The UEs 201 and 202 communicate over the air interface with eNodeBs 203 and 204 respectively. Two eNodeBs are shown in this illustration but there are more eNodeBs connected to the same MME in a deployed network and one eNodeB may be connected to several MMES. In the E-UTRAN, eNodeBs may communicate with each other over the X2 interface 206.

Description of LTE System

LTE wireless networks, also known as Evolved Universal Terrestrial Radio Access Networks (E-UTRAN), are being standardized by the 3GPP working groups (WGs). OFDMA and SC-FDMA access schemes are employed for the downlink (DL) and uplink (UL) of E-UTRAN, respectively as part of the Evolved Universal Terrestrial Radio Access (E-UTRA). Referring now to FIG. 3A, the legacy LTE DL transmission format is illustrated showing the time-frequency resource mapping of physical channels in a 1 millisecond (ms) transmission time interval (TTI), which is also known as a subframe. Downlink control-plane and user-plane data are scheduled by the Physical Downlink Control Channel (PDCCH) or the Enhanced Physical Downlink Control Channel (EPDCCH) and the actual data is transmitted on the Physical Downlink Shared Channel (PDSCH). The minimum granularity for resource allocation for PDSCH and EPDCCH is a physical resource block (PRB) pair. The control region 301 contains DL control signaling including the PDCCH, Physical Hybrid Automatic Repeat reQuest Indicator Channel (PHICH) and the Physical Control Format Indicator Channel (PCFICH). Common and dedicated control information are transmitted on the PDCCH, whereas dedicated control information is transmitted on the EPDCCH 305, 306, if present. Cell-specific reference signals (CRS) are transmitted on one or more antenna ports and can be used for radio resource management (RRM) and radio link monitoring (RLM) functions and for demodulating control information on the PDCCH and data transmission on the PDSCH. Alternatively, a UE is configured to demodulate the PDSCH (302, 303, 304) and/or the EPDCCH (305, 306) using a dedicated demodulation reference signal (DMRS) that is transmitted only within the PRBs containing the data or control information. Essential cell information needed for initial access by a UE is transmitted on the Physical Broadcast Channel (PBCH) while other system information and paging information are transmitted on the PDSCH. The EPDCCH and the PDSCH are frequency-multiplexed across the system bandwidth, where FIG. 3A illustrates a partitioning into three PDSCH regions 302, 303, 304, and two EPDCCH regions 305, and 306. Additional signals such as Channel State Information Reference Signals (CSI-RS) or Positioning Reference Signals (PRS) may also be transmitted in a subframe.

Unicast and multicast data may be transmitted on the same carrier. Unicast consists of a bidirectional point-to-point or point-to-multipoint transmission between the network and each of the UEs with a dedicated connection to each UE. Multicast data transmission to a group of UEs is supported by the evolved Multimedia Broadcast Multicast Service (E-MBMS) feature and consists of a downlink-only multipoint-to-multipoint connection. Only the UEs subscribed to the MBMS service receive the content. Time-sharing of unicast and multicast data is achieved by defining a subset of subframes to support MBMS Single Frequency Network (MBSFN) transmission. FIG. 4 shows an MBSFN subframe 400. The non-MBSFN region 401 contains the PDCCH, PHICH and PCFICH, where the PDCCH can be used to schedule uplink data transmission and for signaling power control commands for a group of UEs. CRS is transmitted in the non-MBSFN region 401 for demodulation of the aforementioned channels. The MBSFN region 402 is used to transmit multicast data on the Physical Multicast Channel (PMCH) for UEs that are subscribed to one or more MBMS services. In an MB SFN area, a set of synchronized eNodeBs may jointly transmit multicast data in an MBSFN subframe thereby improving reception quality. MBSFN reference signals (MBSFN-RS) are thus used in the MBSFN region 402 for demodulation of the PMCH.

Current and future trends in cellular networks have predicted an exponential growth in data traffic partly due to the rapid adoption of mobile Internet devices and the associated data-demanding applications. Increased traffic demands will spur a need for energy conservation particularly as more cells are deployed within the network. Unfortunately, current base stations typically transmit control channels and cell-specific reference signals regardless of whether there is actually any user equipment (UE) being served in the cell.

BRIEF DESCRIPTION OF THE DRAWINGS

FIGS. 9, 10 and 11 illustrate several exemplary mappings of PSS and SSS for both FDD and TDD with the evolved transmission format.

DETAILED DESCRIPTION OF EMBODIMENTS OF THE INVENTION

As cellular networks evolve to cope with this explosive growth in cellular data traffic it has been observed that bottlenecks occur because much of the traffic is localized to hotspots in both indoor and outdoor deployment scenarios. Heterogeneous networks are increasingly becoming popular, wherein small cells controlled by low power base stations are deployed to boost capacity in hotspots and/or improve cellular coverage. In the Third Generation Partnership Project (3GPP) Long Term Evolution (LTE) system, a base station, also known as an evolved NodeB (eNB), always transmits a cell-specific reference signal (CRS) and a time-multiplexed Physical Downlink Control Channel (PDCCH). But always transmitting a cell-specific reference signal and a time-multiplexed Physical Downlink Control Channel (PDCCH) becomes problematic as traffic and demand increases.

Description of an Evolved Transmission Format

Figure 1:
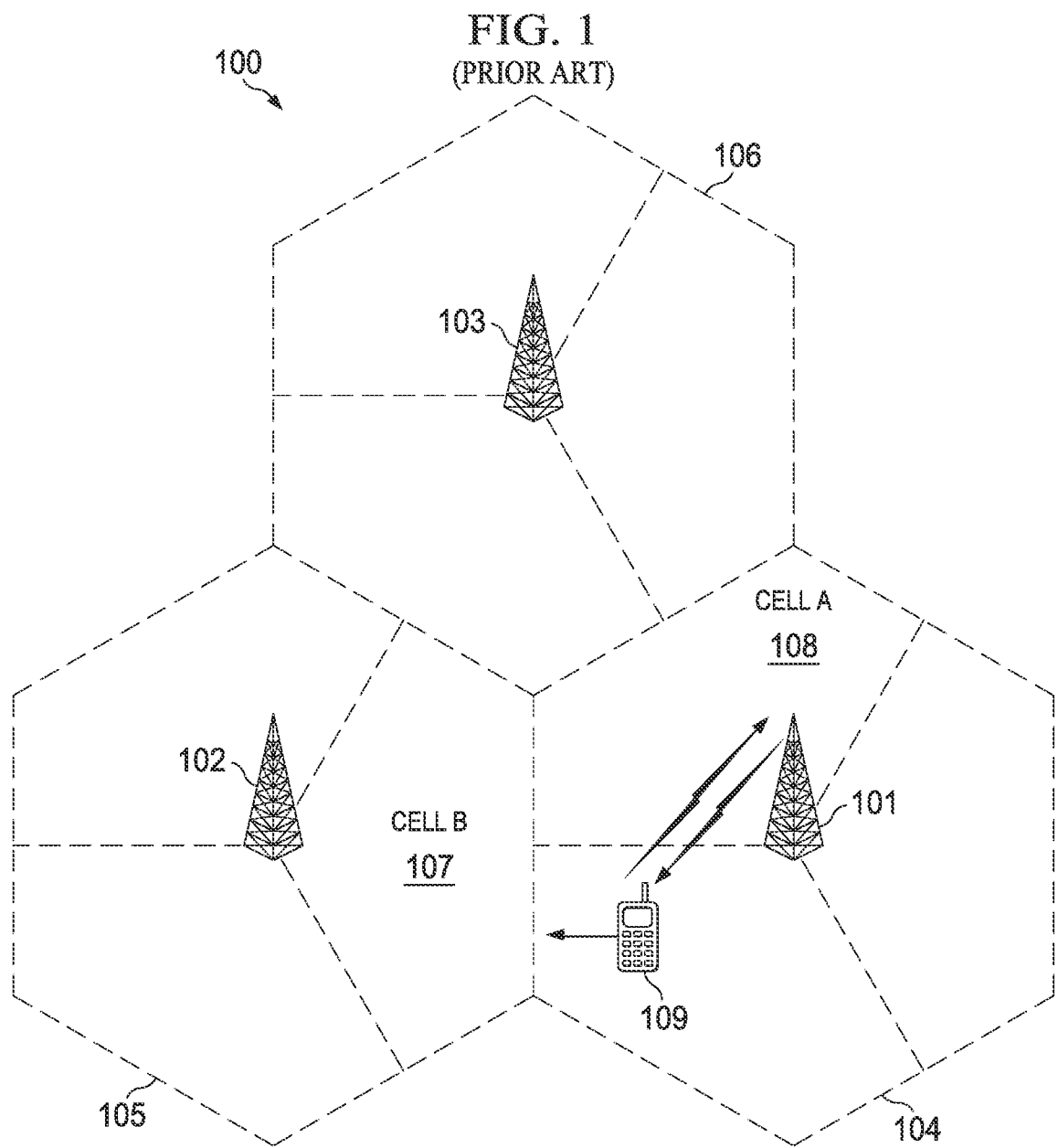
FIG. 1 is a pictorial description of a traditional homogenous network deployment of 3 macro cell sites each consisting of three sectors.
Figure 2:
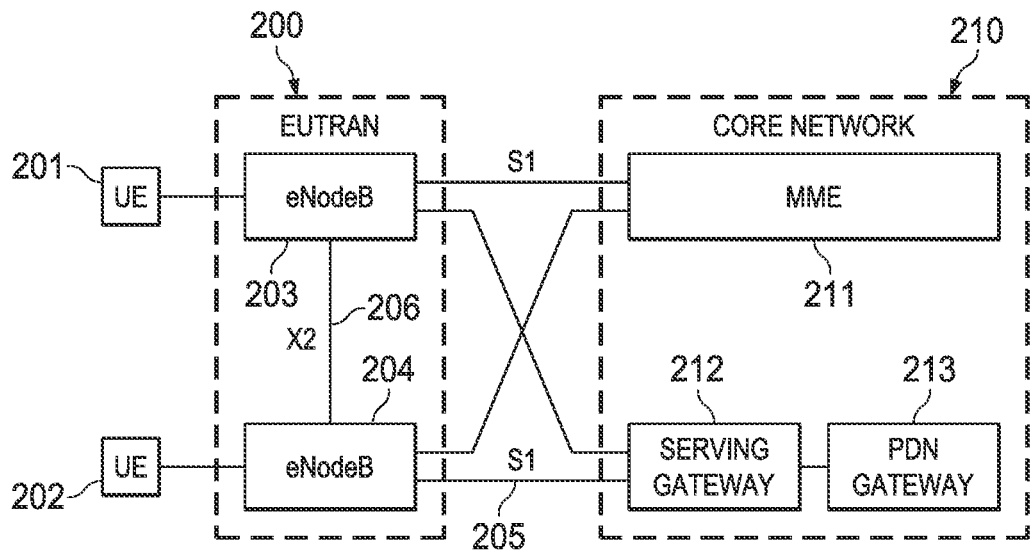
FIG. 2 is a description of the relationship between the E-UTRAN and the Core Network of an LTE network.
Figure 3A:
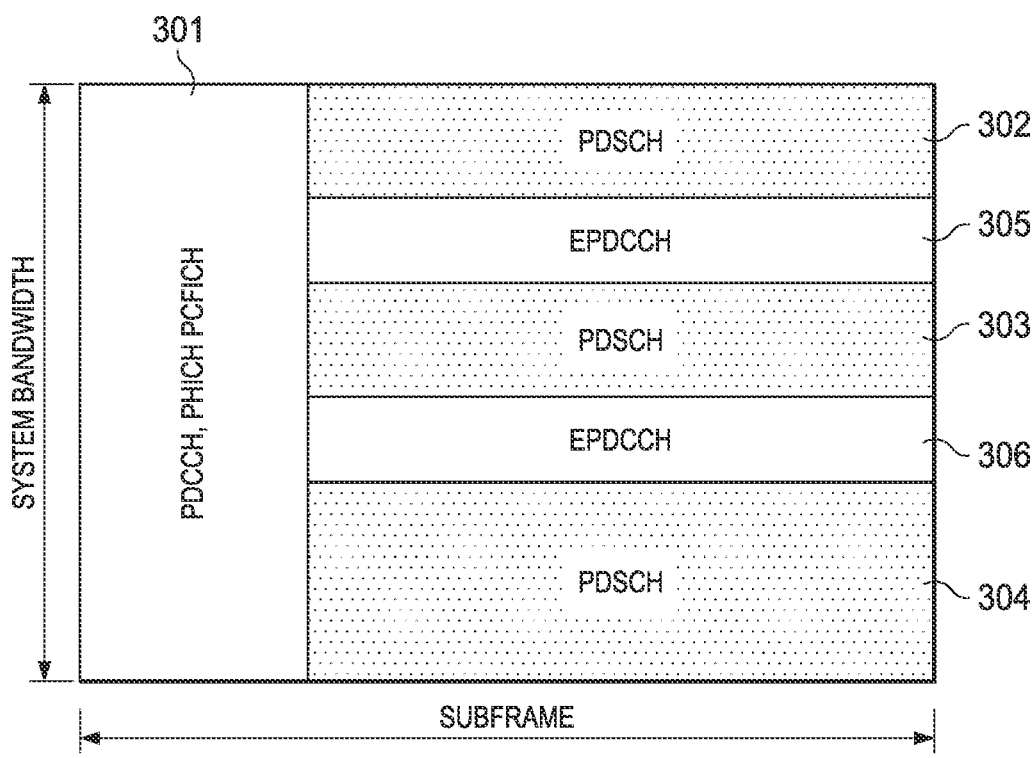
FIG. 3A shows the present LTE DL transmission format illustrating the mapping of physical channels for unicast data and control.
Figure 3B:
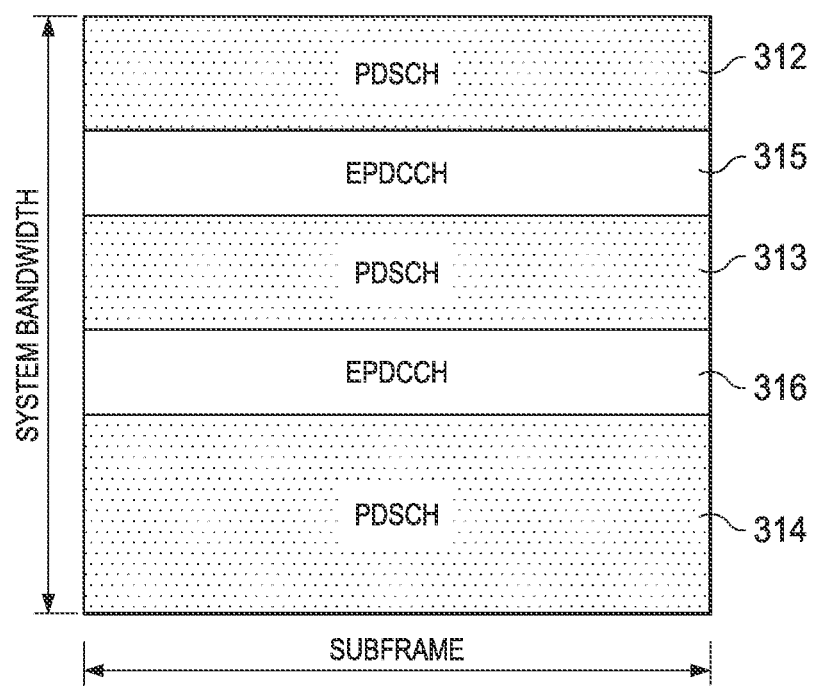
FIG. 3B shows the evolved LTE DL transmission format illustrating the mapping of physical channels for unicast data and control.
Figure 4:
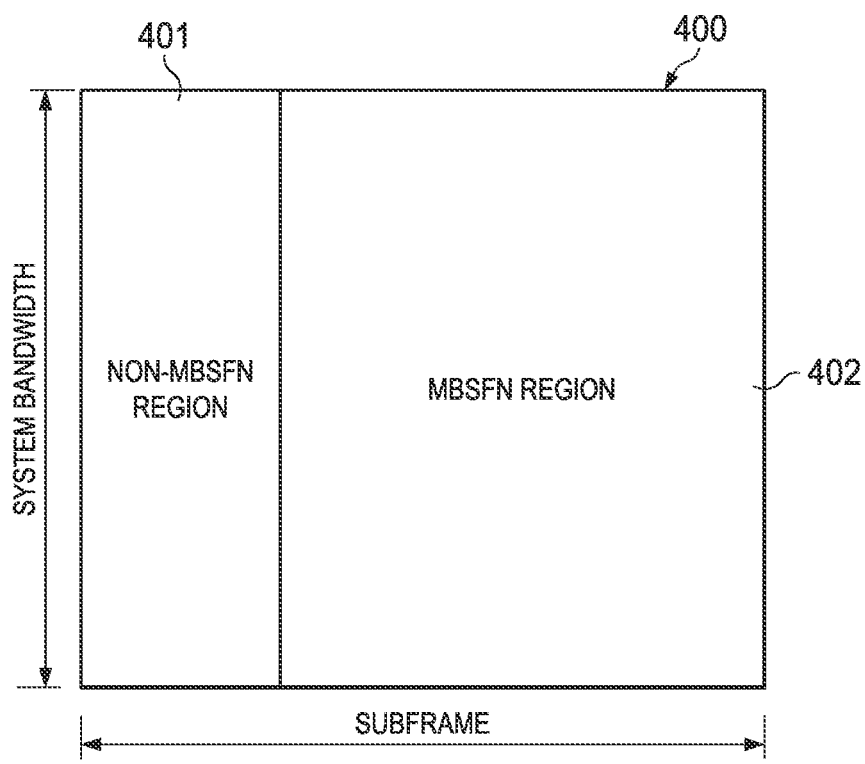
FIG. 4 shows the present LTE DL transmission format illustrating the partitioning of MBSFN subframes into MBSFN and non-MBSFN regions.

The 3GPP radio access network (RAN) standardization body is taking steps to address energy-efficient transmission involving an evolution from an "always on" DL transmission mode to an "on demand" mode. One such technique is the introduction of an evolved DL transmission format, which is characterized by the absence of legacy downlink cell-specific reference signals and control channels including the PDCCH, PHICH and PCFICH which rely on CRS for demodulation. Referring now to FIG. 3B, PDSCH 312, 313, 314 and EPDCCH 315, 316 span the entire subframe. The CRS is transmitted with a reduced density in the time and, optionally, frequency domain. For example, the CRS can be transmitted on a single antenna port with 5-ms periodicity and may either occupy the entire system bandwidth or a reduced bandwidth. Removing legacy control signals and CRS may provide significant energy savings for lightly loaded or unloaded cells. This translates to up to 80% energy savings if one out of five subframes is used for transmissions when there are no UEs in the cell. Moreover, removing legacy control signals and CRS frees up resources that can be used for data transmissions thus increasing spectral efficiency and peak data rates. The evolved transmission format may also be known as a New Carrier Type (NCT). A significant drawback, however, is that a UE of a previous LTE release may not be able to attach to a cell operating with the NCT structure.

The evolved transmission format or NCT can be configured for a secondary cell (SCell) in carrier aggregation (CA) or it can be configured for a single cell operation (standalone mode). For SCell operation all the required system information for the NCT-SCell can be provided to a UE by dedicated signaling. A natural question to ask is whether the benefits of an NCT also accrue if the NCT is deployed in a standalone mode. This means that a UE can attach to the NCT as a primary cell either at initial access or via handover from a different cell. This would require new techniques for accessing a cell, including synchronization, transmission of broadcast and system information and mobility control. For both CA-based or standalone operation new techniques are also required for multiplexing reference signals, synchronization signals and physical channels onto the OFDM time-frequency resource grid.

Towards the goal of improving energy conservation in wireless networks, it is desirable to constrain base station transmissions to time periods where there are data transmissions to user equipment. For example, a small cell deployed within an office building may operate at full power during the day, whereas at night the small cell should operate at reduced power or be completely turned off when there is no one in the building. Furthermore, reduced downlink (DL) signaling also reduces DL inter-cell interference, which is becoming a bottleneck to capacity improvement as more cells are added to the cellular topology.

Energy efficient transmission is enabled by configuring the NCT as a SCell in carrier aggregation. One embodiment of the invention describes a method to configure the evolved transmission format for SCell operation, small cell operation in a heterogeneous network (HetNet), or combinations thereof.

For the CA case, the UE is provided with all system information necessary for receiving data and control information on the SCell through dedicated radio resource control (RRC) signaling. The eNodeB configures a UE for PDSCH reception on a secondary serving cell (SCell) that is configured as a NCT. The eNodeB provides all system information to the UE by RRC signaling including system information contained in the Master Information Block and the System Information Blocks (SIBs). System information that cannot be signaled to the UE such as the System Frame Number (SFN), which changes every 10 ms, is assumed by the UE to be identical for both the NCT SCell and the cell from which the UEs receives the system information via dedicated signaling. Therefore, the PBCH may not be transmitted on the NCT. The eNodeB also provides, via RRC signaling, an indication of whether the SCell is operating using the legacy LTE transmission format or the evolved transmission format. Alternatively, the UE can identify whether the SCell is operating using the legacy LTE transmission format or the evolved transmission format through the presence or absence of existing or new signals. In one embodiment, a discovery signal can identify a SCell as operating using the evolved transmission format. The NCT indication determines the location of the DMRS and this location in turn depends on the duplexing mode (FDD or TDD), the cyclic prefix, or subframe type (normal or special subframe). The NCT indication may also determine whether a PBCH is transmitted on the NCT or not in which case the UE does not rate match the resource elements otherwise reserved for PBCH transmissions. Alternatively, in addition to the aforementioned NCT indication additional RRC signaling may indicate whether a PBCH is transmitted or not, i.e., whether to rate match the resource elements reserved for PBCH transmissions or not.

If the SCell is an NCT the UE performs cell search by detection of the legacy primary and secondary synchronization signals (PSS, SSS), as in the legacy LTE transmission format. Alternatively, the UE may use a discovery signal for cell detection. The PSS/SSS is transmitted in the same time-frequency locations as in the legacy transmission format. In a different embodiment the PSS/SSS locations are different. In yet another embodiment, for instance, PSS/SSS may not be transmitted in each radio frame for improved energy efficiency and inter-cell interference reduction and the UE would either blindly detect the presence of PSS/SSS or, alternatively, be informed by the network through explicit or implicit signaling about the subframes in which to search for PSS/SSS.

Other variations of SCell operation are not precluded. For example, the SCell may be controlled by a second eNodeB which is different from the eNodeB controlling the primary serving cell. Both eNodeBs coordinate their scheduling and RRM decisions to the UE a backhaul connection.

Evolved Transmission Format in Single Cell Operation

For standalone operation of the evolved transmission format new techniques are needed to achieve the goals of energy efficiency, reduced inter-cell interference and increased spectral efficiency.

One such technique is to use demodulation reference signals (DMRS) for transmitting common control information on a shared downlink or broadcast channel. If reduced-density CRS is only used for tracking and not for data demodulation, a new technique is required for DMRS-based transmission of system information, paging notification and common control information including UL power control commands. Such a technique uses specification of a common control channel where all UEs, or a group of UEs, can monitor for control messages scheduling common system information, paging information and group power control commands. Another technique is to transmit broadcast information which the UE needs to attach to a cell without prior reception of a handover command, such as the DL bandwidth and system timing reference (system frame number), using DMRS-based transmissions. Still yet another technique is to use transmissions of UE-specific reference signals for radio resource management (RRM) including new mobility procedures and measurements; for radio link monitoring (RLM) including new RLM procedures and measurements; and channel state information (CSI) feedback including new measurements and procedures based, for instance, on CSI-RS.

Yet still another technique is needed for cell identification and accessibility: a technique is needed to bar UEs of a previous release from access to a cell employing the NCT format. In previous releases, a UE shall acquire MIB and at least SIB Type1 to determine if the cell is barred. If this legacy procedure is followed for a NCT, UEs of a previous release would expend considerable energy during cell search and intra- and/or inter-frequency measurements especially in highly dense small cell deployments. As such, the savings in energy consumption at the network side is now offset by increased energy consumption at the terminal side.

Therefore, to enable access for a UE to a cell operating with the evolved transmission format, the following techniques are proposed:

In one embodiment, if a UE is in RRC_IDLE state, cell attachment follows the conventional LTE procedure in e.g. Releases 8, 9, 10 and 11. The UE may not be able to camp on or attach to this cell because it assumes the legacy transmission format. On the hand if an RRC_IDLE UE discovers an NCT to which it had an RRC connection within the last N hours, where N is a fixed value, the UE may perform initial cell attachment to the NCT without handover via a cell operating with the legacy transmission format. Otherwise the UE searches for a cell operating with the legacy transmission format and attaches to it. The UE may choose to camp on this cell in RRC_IDLE state or may choose to transition to the RRC_CONNECTED state.

In another embodiment, the UE is in RRC_CONNECTED mode and is handed over to a cell operating with the NCT. The handover is network controlled but UE-assisted, i.e., the network may rely on the UE to discover and report the cell operating with the evolved transmission mode. The eNodeB can assist the UE by providing a list of cells for which the UE shall report radio resource management (RRM) measurements. For each cell in this list the eNodeB indicates the transmission format, legacy or NCT.

In yet another embodiment the set of physical cell IDs (PCIs) is split into several ranges and the UE can infer from the provided list of PCIs what transmission format is used by the respective cell. For example, if the range of valid PCIs is split into two ranges each of which contains consecutive cell IDs in increasing order, the set containing PCI 0 is associated with cells operating with the legacy transmission format, whereas the set not containing PCI 0 is associated with the NCT structure.

In an embodiment, RRM measurements including measurement of reference signal received power (RSRP) and reference signal received quality (RSRQ) are performed on channel state information reference signals (CSI-RS). The CSI-RS configuration is configured by RRC signaling from the eNodeB to the UE. In one embodiment, in the list of cells for which the UE shall perform RRM measurements the eNodeB provides a corresponding CSI-RS configuration. In a different embodiment the RRM measurement is performed on the reduced-density CRS. In yet another different embodiment the network provides additional assistance information for the said RRM measurements performed on the reduced-density CRS such as in which time and/or frequency resources to perform the measurement. In yet another embodiment the UE is configured with several such configurations, sometimes referred to as CSI processes, irrespectively of whether the measurement is performed using reduced-density CRS, CSI-RS, or any other discovery signal.

In another embodiment, the eNodeB may configure the UE with reporting criteria for RRM measurement purposes including periodic, event-triggered, or event-triggered/periodic measurements. The eNodeB may further configure the UE to only report the PCI for which the report was triggered. In another embodiment, the eNodeB configures the UE to report the PCI as well as the associated RRM measurement result. The reporting criteria may moreover include offsets such that the UE only reports cell IDs and associated measurements if the cell measurement is better than the serving cell by a certain threshold. The eNodeB may then use the Neighbor Relation Table (NRT) to look up if the reported cell ID is an NCT or not. The eNodeB may also configure the UE with the system bandwidth for each neighbor cell included in the aforementioned list of PCIs. This facilitates accurate RSRP or RSRQ measurements. Alternatively, the eNodeB indicates to the UE the measurement bandwidth for each neighbor cell included in the said list of PCIs.

In still another embodiment, the source eNodeB initiates the handover to the target eNodeB. If the target eNodeB positively acknowledges the handover request the target eNodeB provides the following handover information to the UE, which is relayed via the source eNodeB: RRC reconfiguration information including all system information about the target cell; indication of the transmission format in the target cell; and the UE performs synchronization to target cell depending on the transmission type.

In current LTE specifications through Release 11, the system frame number (SFN) is not exchanged between eNodeBs over the X2 interface. Accordingly, the SFN is not part of the mobility information sent to a UE during handover preparation. If the PBCH is not transmitted for the NCT format, there is no means for a target cell deploying the NCT to indicate the SFN to an incoming UE during or after the handover procedure. A new technique is needed to facilitate handover from a cell operating with the legacy transmission format to a cell operating with the NCT format.

To solve this problem an RRC information element is included in the mobility control information indicating which cell's SFN the UE may use as a reference SFN for the target cell. In other words, the UE is signaled a proxy cell whose SFN—determined by decoding PBCH of the said proxy cell—is used as the reference SFN of the target cell. The RRC information element may contain the PCI of said proxy cell operating with the legacy transmission format. The mobility control information is prepared by the target eNB deploying the NCT. The target eNB can determine a suitable PCI through Operation, Administration and Maintenance (OAM) information or via its neighbor relation table. In another embodiment the reference cell for the SFN of the target cell is implicitly given by the source eNB, i.e., the SFN broadcasted in the PBCH of the source cell is the reference SFN for the target cell with the NCT. In yet another embodiment, the RRC information element contained in the mobility control information indicates the actual SFN of the target cell or, alternatively, an offset which the UE shall apply to the SFN of said proxy cell The mobility technique of providing a reference SFN for a target cell is also beneficial when the target eNB deploys a legacy carrier but operates in cell range extension (CRE). In such a scenario, when a UE is handed over, it experiences heavy interference and may not be able to reliably detect the PBCH of the target cell. This is especially the case if the UE is not equipped with a PBCH interference canceling receiver. This mobility technique could allow the network to configure larger CRE biases, thereby facilitating larger off-loading gains, when UEs are moved from a heavily loaded to a lightly loaded cell, especially for UEs without advanced receivers. Therefore, the SFN reference can be included in the mobility control information independently of whether the target cell deploys a legacy or NCT transmission format. More generally, this proposed mobility technique can be configured whenever a UE cannot reliably detect the PBCH of a target secondary serving cell, where the said cell is controlled by the serving eNodeB or a different eNodeB. Moreover, a cell may be operated with the legacy transmission mode yet a PBCH is not transmitted by the eNodeB controlling such a cell. For instance, a UE may be configured to transmit data to and receive data from a plurality of eNodeBs. In such a case, only one eNodeB may transmit a broadcast channel (viz. a master eNodeB) whereas other eNodeBs (viz. secondary eNodeBs) only transmit data or dedicated control information. In such a deployment, the proposed technique is used to obtain the SFN for a cell controlled by a secondary eNodeB from the PBCH transmitted by the master eNodeB.

Time Multiplexing of Mixed Subframes of Both Legacy and Evolved Transmission Formats As noted previously, the NCT format is not backward compatible. Therefore, a cellular operator may only deploy this transmission format in a cell where all the connected UEs support this feature. Moreover, it would seem more suited to small cells rather than macro cells, which may not be turned off since they provide coverage and ensure a minimum quality of service to all UEs. In addition, a new technique is needed to send common control signaling including broadcast, system information and paging if there is no PDCCH transmission.

Figure 5:
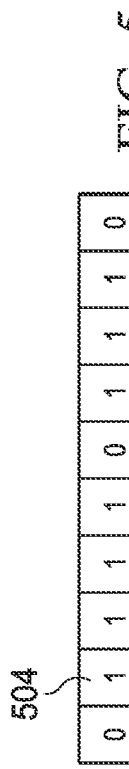
FIG. 5 is a bit map indicating allocation of subframes in a radio frame for the legacy and evolved transmission formats.

A solution to address these shortcomings of the NCT is by time domain multiplexing of subframes operating both legacy and evolved transmission formats. The eNodeB may indicate to a UE the set of subframes operating with either the legacy or evolved transmission structure. The subframe indication is communicated to the UE by RRC signaling. In one embodiment the subframe indication is in the form of a bitmap. A bit value '1' indicates that the subframe is of the NCT format whereas a bit value '0' indicates that the subframe is of the legacy transmission format i.e. the said subframe contains a time-multiplexed control region and either a unicast or multicast data region. Referring now to FIG. 5, an exemplary bitmap of length ten is shown for one radio frame. Other bitmap sizes are possible as well. Subframes 501, 502, 503 use the legacy transmission format, wherein the UE monitors the PDCCH for common and dedicated control signaling and CRS may be used for demodulation of some of the channels transmitted in this subframe. The UE may also use these subframes for radio link monitoring (RLM) or radio resource management (RRM) measurements. The UE may also be configured to monitor the EPDCCH in subframes 501, 502 and 503. The other subframes such as 504 indicate the NCT format. Thus, in these subframes, the UE monitors only the EPDCCH for downlink control information as the PDCCH is not transmitted. In a different embodiment of this invention, a UE is signaled a bitmap indicating a set of subframes where the UE monitors the PDCCH. The UE may either be configured to monitor for both DL assignments, UL grants and group power control commands, or only to monitor for UL grants and group power control commands. This subframe indication concept is applied in different methods for energy efficient multiplexing of (a) unicast and multicast data and (b) transmissions with legacy and evolved transmission formats in a cell.

Monitoring of Control Channels and PBCH

The subframes operating with the legacy transmission structure consist of a PDCCH region and contain CRS transmissions with one, two or four antenna ports. These legacy subframes are used to transmit common control information on the common search space of the PDCCH. The set of legacy subframes shall at least contain subframe 0 of each radio frame. Hence the PBCH is transmitted and can be detected by UEs of all LTE releases. The PDSCH is demodulated using the DMRS in all subframes. Alternatively, the UE is configured for data demodulation using CRS or DMRS in legacy subframes and only DMRS in NCT subframes. In yet another embodiment, the downlink control information (DCI) format received on the control channel indicates to the UE which reference signal to use for demodulation. However, the UE demodulates the PBCH and PDCCH using 1-, 2- or 4-port CRS.

In a different embodiment the UE may demodulate the PBCH and PDCCH using 1-port CRS i.e. at most 1-port CRS is transmitted in a mixed-subframe transmission format. RRM, RLM and/or CSI measurements are performed in subframes carrying 1-port CRS.

Multiplexing of PMCH, PDSCH, EPDCCH and PDCCH

It is possible to operate with the NCT format in one cell and with the legacy transmission format in a different cell when both cells are deployed on the same carrier frequency. The NCT format is used exclusively in all subframes in the small cell or only in those subframes configured for transmissions using the evolved transmission format. In such a scenario, MBMS services can be provided in an MBSFN area made up by cells operating with the different transmission formats. For example, in a heterogeneous network, macro cells and small cells may respectively operate with the legacy and evolved transmission formats on a shared carrier frequency. Therefore, if both macro and small cell eNBs take part in the MBSFN transmission, at least for the subframes carrying PMCH in the small cells, the PMCH transmissions should be synchronized with the PMCH transmissions in macro cells. Consequently, the first one or two OFDM symbols in the small cell layer is wasted in order to align MBSFN transmission across macro and small cell layers since the small cell does not contain a control region.

To address this wastage, the small cell eNB may transmit the PDCCH in said one or two OFDM symbols. This allows scheduling of uplink data transmission on PUSCH in a future subframe. A bitmap is signaled to the UE to indicate which subframes are reserved for PMCH transmissions regardless of whether or not the UE subscribes to MBMS service(s) in the cell operating with the evolved transmission structure. In subframes for which a PMCH is indicated the UE monitors the PDCCH as in the legacy transmission structure. As a further embodiment to reduce UE PDCCH processing the UE can be configured to only monitor the PDCCH in PMCH subframes for either UL grants or group power control commands. In yet another embodiment in subframes for which a PMCH is indicated the UE monitors the PDCCH as in the legacy transmission structure for downlink control information scheduling DMRS-based PDSCH transmissions. The starting OFDM symbol of such a PDSCH transmission is indicated by the PCFICH received in the legacy transmission structure of such a subframe or is configured by higher layers. This allows the network to schedule unicast transmissions in subframes for which a PMCH is indicated but no PMCH is scheduled or PMCH is scheduled but no data has been received by the eNodeB due to congestion in the backhaul connection. In subframes for which no PMCH is indicated the UE monitors the EPDCCH.

Multiplexing of Unicast/Multicast Data in the Evolved Transmission Format

In an MBSFN area, a set of synchronized eNodeBs jointly transmit multicast data in an MBSFN subframe. Since the eNodeBs are in geographically spread locations an extended cyclic prefix (CP) of length 16.67 microseconds has been specified in the LTE standard to support the large delay spreads seen by a UE in an MBSFN area. Allowing an even longer CP would also support an increase in the MBSFN area. This in turn increases the MBSFN combining gain at the UE since more synchronized eNBs can take part in multicast transmission. For example, the CP length can be doubled to 33.33 µs and the symbol length also doubled to maintain the same CP overhead. This technique is not backward compatible i.e. an MBMS service for an enhanced MBSFN area cannot be enjoyed by UEs of an earlier LTE release. This reduces the motivation for a cellular operator to provide such a feature as the potential revenue may not offset the required capital investment. On the hand, this is beneficial to an operator where backward compatibility is not a concern. For example, the NCT format is deployed in a frequency band that is not currently supported by UEs of an earlier release or one for which special permissions are needed for access. Therefore, we propose the following techniques to support multiplexing of unicast and multicast data in a cell operating with the evolved transmission format.

In one embodiment, MBMS and unicast data is time-multiplexed on the NCT transmission format. There are two types of subframes, namely a normal subframe for conveying unicast data (PDSCH and EPDCCH), and an MBSFN subframe for multicast data. For both normal and MBSFN subframes the PDSCH and PMCH transmission starts at symbol 0. Subframes 0 and 5 may not be configured as MBSFN subframes i.e. MBSFN subframe utilization ratio is capped at 80%.

In another embodiment, an evolved Physical Broadcast Channel (EPBCH) is transmitted in the second slot of the first subframe of a radio frame. Alternatively, the EPBCH can be transmitted in the first slot of same subframe. In yet another embodiment, the EPBCH may span both slots in a PRB pair. The EPBCH is demodulated by a group-specific reference signal on one or two antenna ports. In one embodiment the group-specific RS may use the same waveform and random number generator as the UE-specific RS in LTE Release 11 on antenna ports {7}, {8} or {7, 8}. Other combinations are not precluded such as {7, 9} or {9, 10}. The position of this group-specific RS in the time-frequency resource grid of LTE is the same as for the existing UE-specific RS. In a different embodiment a new set of EPBCH RS can be transmitted on one or two antenna ports wherein said RS shall be contained in the OFDM symbols and the PRBs containing the EPBCH.

Figure 6:
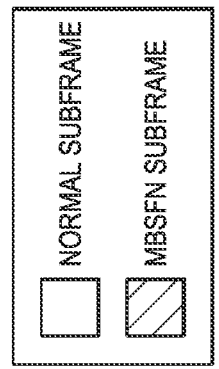
FIG. 6 shows exemplary mappings of normal and MBSFN subframes for the evolved transmission format for both FDD and TDD.
Figure 7A:
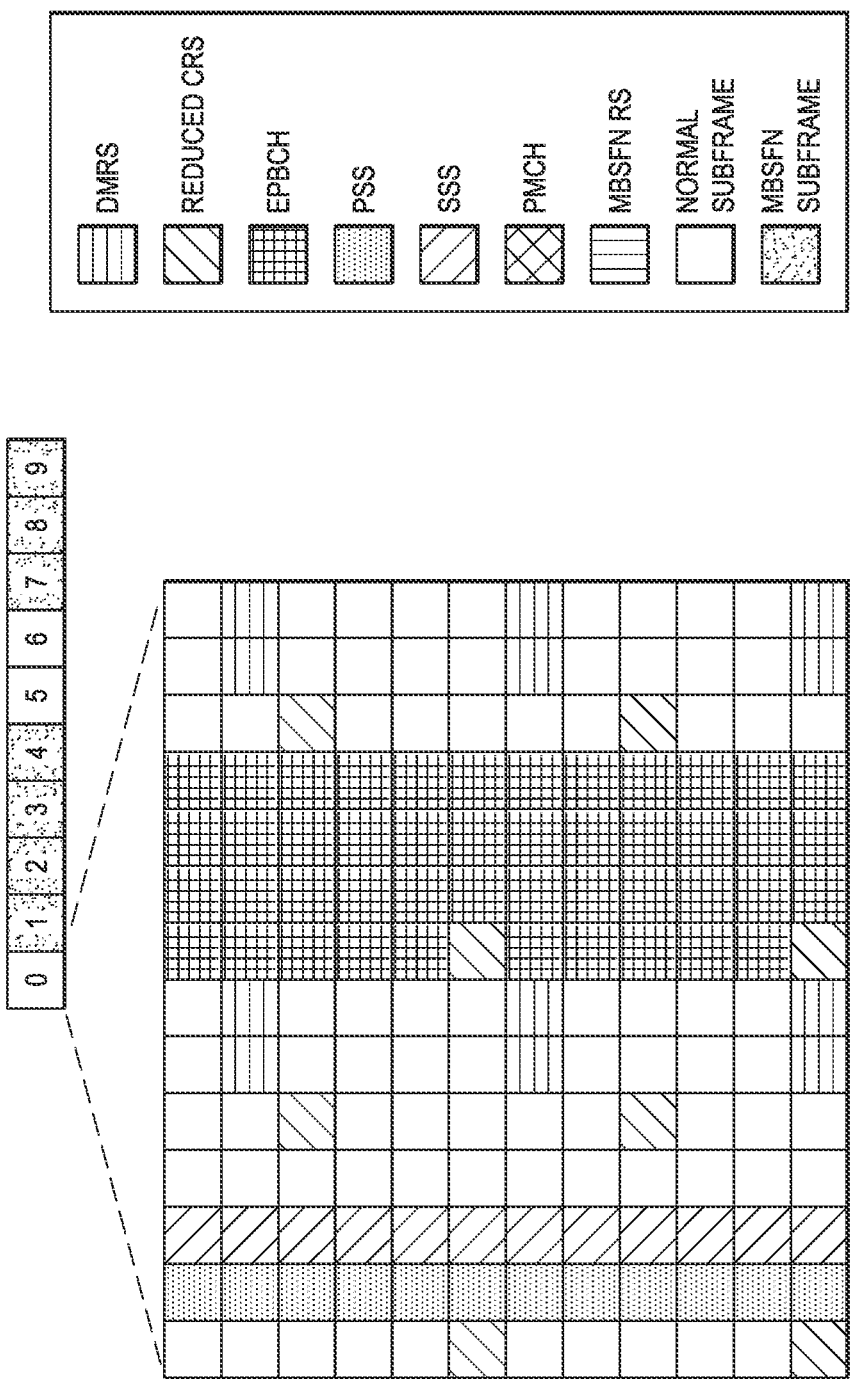
FIGS. 7A & 7B (FIG. 7) shows a mapping of channels and signals on a time-frequency grid: (a) moving PSS/SSS to avoid collision with group-specific RS, and (b) moving group-specific RS into EPBCH region to avoid collision with PSS/SSS.
Figure 7B:
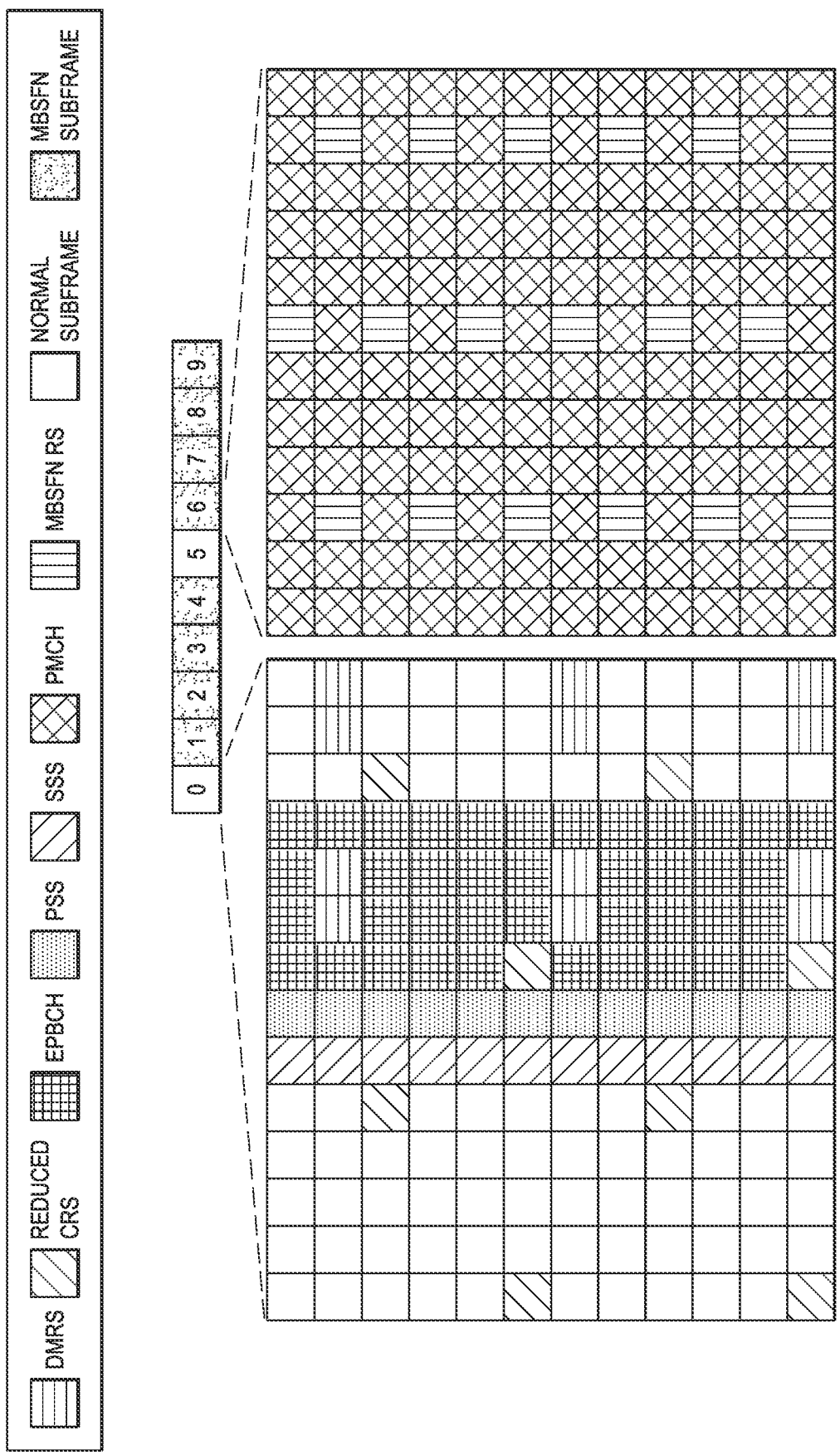

In yet another embodiment, primary and secondary synchronization signals (PSS/SSS) are transmitted in subframes 0 and 5 for FDD and for TDD in subframes 0 and 5 for SSS and 1 and 6 for PSS. In still yet another embodiment, the PMCH is transmitted in a subset of the subframes. For FDD the subset of MBSFN subframes is taken from {1, 2, 3, 4, 6, 7, 8, 9} while for TDD the subset of MBSFN subframes is taken from {3, 4, 7, 8, 9} because subframe 2 is always UL and subframe 6 conveys the PSS in existing TDD UL-DL configurations. Alternatively for TDD, PSS and SSS can be conveyed in subframes 0 and 5 for TDD, freeing up subframes 1 and 6 as potential MBSFN subframes. FIG. 6 shows an exemplary mapping for FDD and TDD. FIG. 7 illustrates an exemplary mapping of EPBCH, PSS/SSS and PMCH to a PRB of the center six PRBs of the system bandwidth. FIG. 7A shows a time-multiplexing scheme of mixed unicast and multicast data on a NCT. The PSS and SSS are moved to symbols 1 and 2 respectively in order to avoid colliding with group-specific (demodulation) RS on symbols 5 and 6. FIG. 7B shows an alternative embodiment where demodulation RS for antenna ports 7 and 8 are shifted from symbols 5/6 of slot 0 to symbols 1 and 2 of slot 1 in subframe 0. This maintains the same position of PSS and SSS as in the legacy transmission format. This mapping design allows the same coding rate for EPBCH as for the legacy PBCH since 8 resource elements per PRB (2 for 1-port CRS and 4 for group-specific RS) are used for RS. It should be noted that the EPBCH may not require a PHICH configuration. By reducing the number of spare bits to 5 the payload for the Master Information Block (MIB) can be reduced to 2 octets (16 bits). This offers a lower coding rate of $(16+16)/480=\frac{1}{60}$ (with 16 CRC bits) when compared to a coding rate of $\frac{1}{40}$ for legacy PBCH.

In an embodiment, the length of the cyclic prefix for PMCH transmission is extended to support larger delay spreads. In another embodiment the CP is set to 33.33 microseconds.

In another embodiment, control information to support reception of multicast traffic and control channels (e.g., MBSFN subframe configuration and MCCH scheduling occasions) is provided via broadcast of system information in unicast subframes scheduled by a common search space on the Enhanced Physical Downlink Control Channel (EPDCCH). Specifically, the EPDCCH is now the physical control channel supporting multicast transmission similarly to the PDCCH in previous LTE releases.

Figure 8:
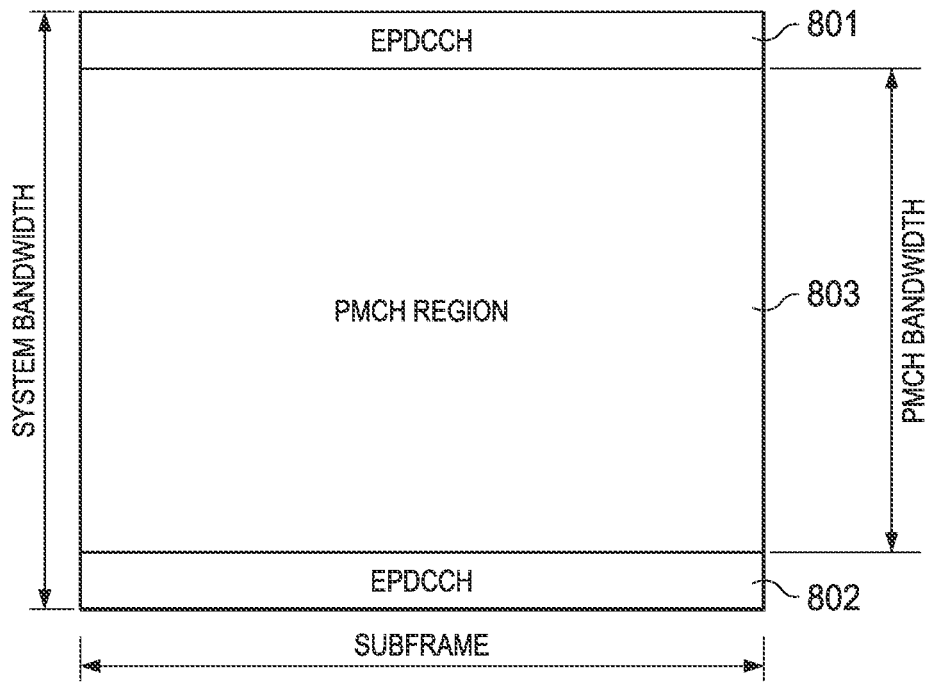
FIG. 8 shows a mapping of PMCH and EPDCCH in an MBSFN subframe of the evolved transmission format.

In yet another embodiment, for FDD where there is a paired UL carrier or for TDD with one or more UL subframes, a new technique is needed to support scheduling of UL grants in MBSFN subframes. Two alternatives are: Option 1: EPDCCH and PMCH are frequency multiplexed in an MBSFN subframe. The bandwidth for PMCH transmission $N_{RB}^{PMCH}$ is defined in system information broadcast, where $N_{RB}^{PMCH} \leq N_{RB}^{DL}$ the DL system bandwidth. The EPDCCH is configured in the subset of PRBs that are not part of the PMCH bandwidth as shown in FIG. 8. It is noted that in a subframe containing PMCH transmissions the eNodeB can schedule PDSCH transmissions, e.g., using the existing transmission modes TM 9 and 10, in the PRBs reserved for EPDCCH following the procedures for PDSCH transmissions whose resource allocations do not overlap with the ones of the scheduling EPDCCH. In other words, unicast and PMCH transmissions are multiplexed in the frequency domain in an MBSFN subframe. Option 2: scheduling of UL grants only occurs in subframes of the legacy transmission format. For example, if the MBSFN subframe configuration for a radio frame in FDD is {1, 2, 3, 4, 6, 7, 8, 9}, the UL subframes for a paired carrier are scheduled as follows: UL grants for subframes 0 through 4 are transmitted in subframe 0, while UL grants for subframes 6 through 9 are transmitted in subframe 5.

Multiplexing EPDCCH, PRS and PMCH in the Evolved Transmission Format

EPDCCH and PMCH can be transmitted in the same sub-frame when the system bandwidth is partitioned into M sets with M−1 sets assigned for transmission of EPDCCH and one set for PMCH. These M−1 sets may partially overlap but are mutually disjoint with the M-th set not assigned for EPDCCH transmission which is used for transmission of PMCH. If the M sets configured for PMCH and EPDCCH transmissions do not span the entire system bandwidth an EPDCCH may schedule PDSCH in those PRBs not covered by the M sets. In addition, PDSCH transmissions in subframes configured for PMCH transmissions could overlap some of the PRBs that are part of the M−1 sets assigned for transmission of EPDCCH.

In one embodiment the union of the M−1 sets is signaled to a UE via a bitmap of length {6, 15, 25, 50, 75, 100} where a bit value '1' indicates that the corresponding PRB pair in the frequency-domain is used for EPDCCH, whereas a bit value of '0' indicates the corresponding PRB pair is assigned for PMCH. Other mappings are not precluded, the main idea being that the bitmap indicates which PRB pairs are used for EPDCCH and PMCH. Alternatively, a bit value '0' may indicate the corresponding PRB in the frequency-domain is used for EPDCCH.

In another embodiment, a combinatorial index is used to indicate to a UE the PRBs in the frequency-domain used for PMCH.

Multiplexing EPDCCH and PMCH in the frequency domain requires that the EPDCCH is transmitted with an extended cyclic prefix (CP) whenever the two channels coexist in an OFDM symbol as PMCH is only specified for extended CP. Since an eNB may not know if a UE is currently subscribed to MBMS and is thus receiving PMCH and since a UE needs to know the CP for demodulation, a method is needed that removes any ambiguity between an eNB and a UE with regard to the CP used for a given OFDM symbol. The eNB may transmit the EPDCCH with normal or extended cyclic prefix (CP) according to a bitmap which is known to the UE through configuration by higher layers. If PDSCH transmissions are scheduled in a subframe configured for PMCH transmission the CP of that PDSCH follows the aforementioned bitmap configured by higher layers as well. Alternatively, the CP of the PDSCH could follow the CP of the scheduling EPDCCH. This would, however, require special treatment of the case where the scheduling cell is different from the serving cell (cross-carrier scheduling). In other words, the EPDCCH scheduling the PDSCH in a subframe configured for PMCH might be transmitted with normal CP or extended CP depending on the subframe on that component carrier whereas the PDSCH follows the bitmap provided by higher layers.

The length of such a bitmap can be 6, 10, 24, 40, or any other integer value. In one embodiment, a '1' indicates to use extended CP in the associated sub-frame. In another embodiment, a '0' indicates to use extended CP in the associated sub-frame. The sub-frames, in which extended CP is used for EPDCCH transmission, shall at least contain all sub-frames in which PMCH is transmitted. To avoid puncturing of EPDCCH by positioning reference signals (PRS), if frequency resources are partitioned to multiplex PMCH and EPDCCH, PRS can be transmitted only in those PRBs that are configured for PRS transmission by higher layers and are part of the PMCH partition in subframes configured for PRS transmission. Alternatively, PRS can be transmitted only in those PRBs that are configured for PRS transmission by higher layers and are part of the PMCH partition in sub-frames configured for PRS transmission that are also indicated for EPDCCH transmission with extended CP.

In an MBSFN area, the participating eNBs must transmit the PMCH over the same bandwidth. A first eNB can thus transmit a message to a second eNB via a backhaul connection informing the second eNB which PRBs it intends to use for transmission of PMCH. In one embodiment this message is a bitmap of length {6, 15, 25, 50, 75, 100} where a '1' indicates the associated PRB in the frequency-domain is used for PMCH. Alternatively, a '0' may indicate the associated PRB in the frequency-domain is used for PMCH. In another embodiment, a combinatorial index is used to indicate in such a message the PRBs in the frequency-domain used for PMCH. A first eNB can also transmit a request for PMCH information to a second eNB via a backhaul connection, wherein said second eNB responds with a message informing said first eNB which PRBs it intends to use for transmission of PMCH.

Location of PSS/SSS/DMRS for the Evolved Transmission Format

Figure 11:
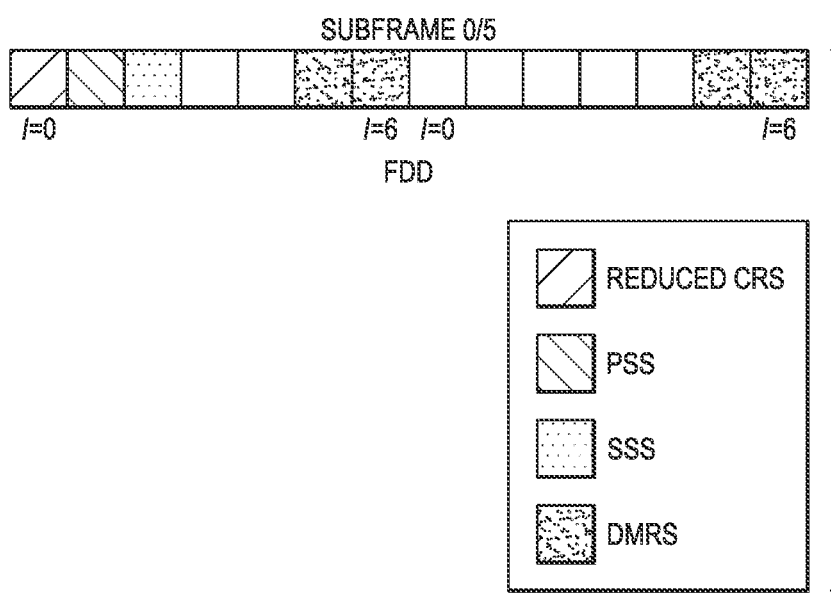

In present LTE releases the DMRS is not transmitted in the center six PRBs of the system bandwidth if it collides with the PSS and SSS. As the reduced CRS may not be suitable or sufficient for PDSCH demodulation, a new solution is required to enable PDSCH demodulation with the UERS. The location of the PSS and SSS is changed for a cell operating with the evolved transmission format. In one embodiment the relative locations of PSS and SSS are changed compared to the legacy transmission format to allow easy differentiation between transmission formats and duplexing mode. FIG. 9 describes an exemplary mapping where the SSS precedes the PSS by 2 symbols for FDD, whereas the PSS precedes the SSS by 3 symbols for TDD. An additional benefit of this mapping for TDD is that it allows for the possibility that the reduced CRS is transmitted in the first symbol of a special subframe. A different embodiment is shown in FIG. 10. For FDD the SSS is mapped to the last symbol of subframes 0 and 5 whereas the PSS is mapped to the symbol preceding the SSS i.e. $13^{th}$ symbol for normal CP and $11^{th}$ symbol for extended CP. In yet another embodiment for FDD is shown in FIG. 11, wherein the PSS and SSS are moved to OFDM symbols 1 and 2 respectively.

What is claimed:

1. A user equipment (UE) comprising:
   a receiver configured to receive an indication of a carrier type via Radio Resource Control (RRC) signaling, wherein a physical broadcast control channel (PBCH) is not present on a cell configured according to a first carrier type, wherein a physical downlink control channel configuration for the first carrier type is different than a physical downlink control channel configuration for the second carrier type; and
   a processor configured to perform a cell search using a primary synchronization sequence (PSS) having locations that are determined based on the carrier type indicated by the RRC signaling.

2. The UE of claim 1, wherein the indication of the carrier type includes an indication of a legacy carrier type.

3. The UE of claim 1, wherein the indication of the carrier type includes an indication of a new carrier type (NCT).

4. A method comprising:
   receiving, at a user equipment (UE), an indication of a carrier type via Radio Resource Control (RRC) signaling, wherein a physical broadcast control channel (PBCH) is not present on a cell configured according to a first carrier type, wherein a physical downlink control channel configuration for the first carrier type is different than a physical downlink control channel configuration for the second carrier type; and
   performing, by the UE, a cell search using a primary synchronization sequence (PSS) having locations that are determined based on the carrier type indicated by the RRC signaling.

5. The method of claim 4, wherein the indication of the carrier type includes an indication of a legacy carrier type.

6. The method of claim 4, wherein the indication of the carrier type includes an indication of a new carrier type (NCT).

* * * * *